US011430104B2

(12) United States Patent
Barish et al.

(10) Patent No.: US 11,430,104 B2
(45) Date of Patent: Aug. 30, 2022

(54) THREE-DIMENSIONAL (3D) IMAGING SYSTEMS AND METHODS FOR DETECTING AND DIMENSIONING A VEHICLE STORAGE AREA

(71) Applicant: ZEBRA TECHNOLOGIES CORPORATION, Lincolnshire, IL (US)

(72) Inventors: Justin F. Barish, Kings Park, NY (US); Adithya H. Krishnamurthy, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 112 days.

(21) Appl. No.: 16/795,243

(22) Filed: Feb. 19, 2020

(65) Prior Publication Data

US 2021/0256682 A1    Aug. 19, 2021

(51) Int. Cl.
*G06T 7/00* (2017.01)
*G06T 7/593* (2017.01)
*G06T 15/00* (2011.01)
*G06T 7/62* (2017.01)

(52) U.S. Cl.
CPC ............ *G06T 7/0004* (2013.01); *G06T 7/593* (2017.01); *G06T 7/62* (2017.01); *G06T 15/00* (2013.01); *G06T 2207/10028* (2013.01)

(58) Field of Classification Search
CPC ........ G06T 7/0004; G06T 7/593; G06T 15/00
See application file for complete search history.

(56) References Cited

U.S. PATENT DOCUMENTS 10,867,275 B1 * 12/2020 Dholakia ........... G06K 9/00771
2014/0372183 A1 * 12/2014 Groble .................. G06Q 50/28
705/7.38

* cited by examiner

*Primary Examiner* — Zhitong Chen
(74) *Attorney, Agent, or Firm* — Yuri Astvatsaturov (57) ABSTRACT

Three-dimensional (3D) imaging systems and methods are disclosed for detecting and dimensioning a vehicle storage area. A 3D-depth camera captures 3D image data comprising one or more 3D image datasets of the vehicle storage area during corresponding one or more image capture iterations. A 3D data analytics application (app) executing on one or more processors communicatively coupled to the 3D-depth camera and for each one or more image capture iterations, updates a number of planar regions detected within the one or more 3D image datasets. The 3D data analytics app further assigns a vehicle storage area type to the vehicle storage area based on the number of planar regions detected by the 3D analytics app over the one or more image capture iterations.

13 Claims, 8 Drawing Sheets
(2 of 8 Drawing Sheet(s) Filed in Color)

THREE-DIMENSIONAL (3D) IMAGING SYSTEMS AND METHODS FOR DETECTING AND DIMENSIONING A VEHICLE STORAGE AREA

BACKGROUND OF THE INVENTION

In the transportation industry, commercial trailers are typically loaded using a variety of different techniques that take into account a variety of different sizes and configurations of boxes, packages, or other items for shipping or transit. In addition, commercial trailers, themselves, typically have various sizes and storage capacities (e.g., where such trailers are constructed to handle different cargo sizes, loads and/or configurations). All of the various loading techniques, box sizes/configurations, and trailer sizes/configurations create various permutations of loading strategies, techniques, and differences in overall loading operations that are difficult for loaders and/or managers overseeing loading of such commercial trailers to manage.

Such various permutations of loading strategies, sizes, and configurations create problems in tracking performance or quality of loading metrics across different personnel (e.g., loaders), each of which may be located in different geographic locations and/or employ different loading regimens. In particular, loaders or managers may desire a greater understanding and improved metrics relating to the efficiency of how their trailers are loaded so that they can employ or make better management decisions to improve loading time or otherwise loading efficiency for logistical operations associated with commercial trailers. Currently, in some instances, such managers or loaders use a simple metric, e.g., the total time it takes loaders (e.g., employing different strategies) to load a commercial trailer, as measured by the total time a trailer spends at a docking bay door. However, such a metric is problematic, at least because it is deficient because it provides little insight to improve operational or loading efficiency. For example, loading managers relying on this metric typically have no knowledge of how much time is actually being spent loading the trailer, how much time the trailer sits idle at the dock door, etc.

The issues are especially acute for different sized or configured trailers. For example, such differently configured/sized trailers include standard straight-rail trailers and drop-frame trailers. Whereas straight-rail trailers have a flat or substantially flat bottom—which generally allows for easier loading and dimensioning analytics—a drop-frame trailer has a raised floor in the middle, and flaps, or cavities, on each side to place boxes, or other storage, underneath, which complicates analytics. In particular, drop frame trailers introduce problems with camera based analytics because, firstly, dimensioning becomes difficult, as there can be multiple bottoms to the trailer, and secondly, it is difficult to accurately detect or determine boxes or packages inside the bottom compartments. In addition, because of the various trailer types, without knowing the trailer type, any analytics determined are often inaccurate.

Accordingly, there is a need for three-dimensional (3D) imaging systems and methods for detecting and dimensioning vehicle storage areas to determine and measure different vehicle storage area types.

SUMMARY

Accordingly, in an embodiment, the present disclosure describes a three-dimensional (3D) imaging system configured to detect and dimension a vehicle storage area. In various embodiments, the 3D imaging system includes a 3D-depth camera configured to capture 3D image data. The 3D-depth camera may be oriented in a direction to capture 3D image data of a vehicle storage area. In addition, the 3D imaging system includes a 3D data analytics application (app) executing on one or more processors communicatively coupled to the 3D-depth camera. In various embodiments, the 3D data analytics app is configured to capture one or more 3D image datasets of the vehicle storage area during corresponding one or more image capture iterations. In addition, the 3D data analytics app is configured to update, for each one or more image capture iterations, a number of planar regions detected within the one or more 3D image datasets. The 3D data analytics app is further configured to assign a vehicle storage area type to the vehicle storage area based on the number of planar regions detected by the 3D analytics app over the one or more image capture iterations. The vehicle storage area type assigned may be one of (1) a straight-rail trailer type when the number of planar regions detected equals one planar region, or (2) a drop-frame trailer type when the number of planar regions detected exceeds one planar region.

In an additional embodiment, the present disclosure describes a 3D imaging method for detecting and dimensioning a vehicle storage area. The 3D imaging method comprises capturing, by a 3D-depth camera oriented in a direction to capture 3D image data of a vehicle storage area, 3D image data comprising one or more 3D image datasets of the vehicle storage area during corresponding one or more image capture iterations. The 3D imaging method further comprises updating, by a 3D data analytics app executing on one or more processors communicatively coupled to the 3D-depth camera and for each one or more image capture iterations, a number of planar regions detected within the one or more 3D image datasets. The 3D imaging method further comprises assigning, by the 3D data analytics app, a vehicle storage area type to the vehicle storage area based on the number of planar regions detected by the 3D analytics app over the one or more image capture iterations. The vehicle storage area type assigned may be one of (1) a straight-rail trailer type when the number of planar regions detected equals one planar region, or (2) a drop-frame trailer type when the number of planar regions detected exceeds one planar region.

In a still further embodiment, the present disclosure describes a tangible, non-transitory computer-readable medium storing instructions for detecting and dimensioning a vehicle storage area, that when executed by one or more processors cause the one or more processors to capture, by a 3D-depth camera oriented in a direction to capture 3D image data of a vehicle storage area, 3D image data comprising one or more 3D image datasets of the vehicle storage area during corresponding one or more image capture iterations. The instructions, when executed by the one or more processors may further cause the one or more processors to update, by a 3D data analytics app, for each one or more image capture iterations, a number of planar regions detected within the one or more 3D image datasets. The instructions, when executed by the one or more processors may further cause the one or more processors to assign, by the 3D data analytics app, a vehicle storage area type to the vehicle storage area based on the number of planar regions detected by the 3D analytics app over the one or more image capture iterations. The vehicle storage area type assigned may be one of (1) a straight-rail trailer type when the number of planar regions detected equals one planar region, or (2) a drop-frame trailer type when the number of planar regions detected exceeds one planar region.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Figure 1:
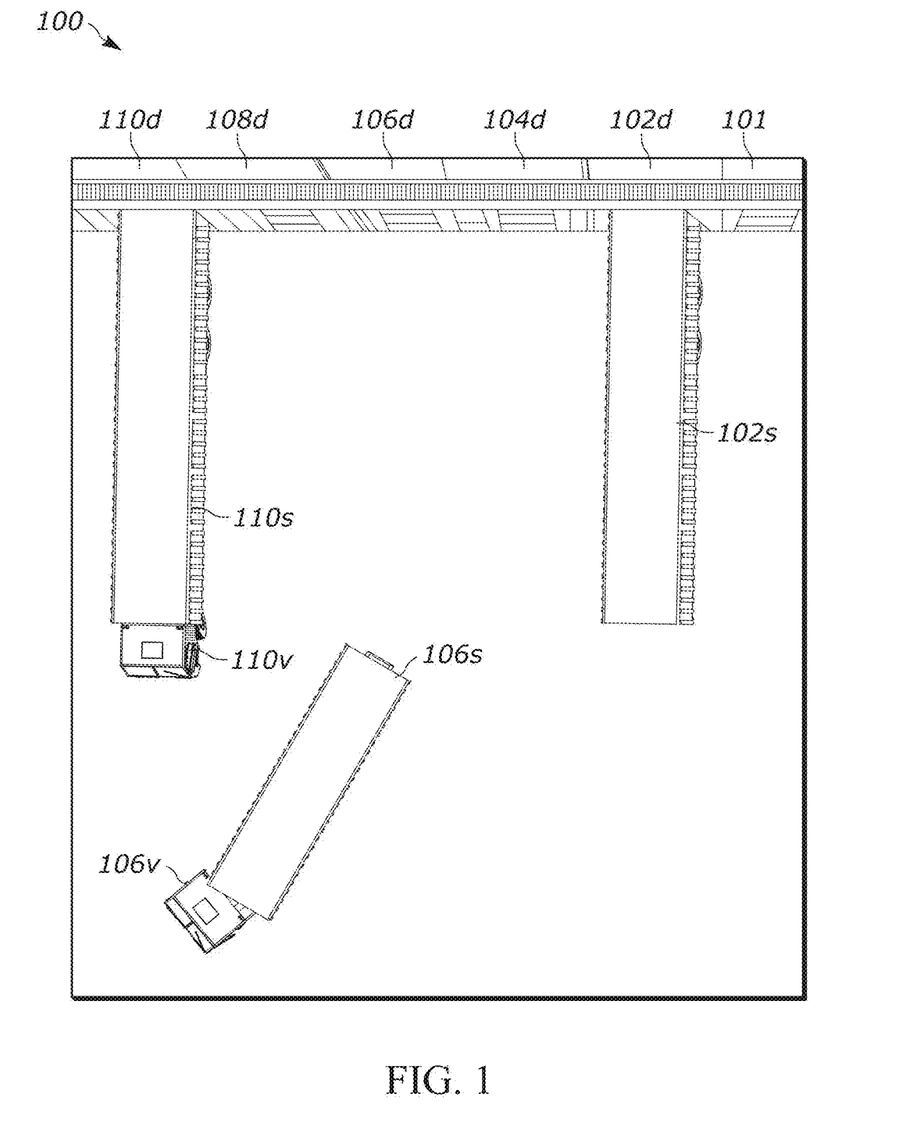
FIG. 1 is a perspective view, as seen from above, of a loading dock including a loading facility, a plurality of docking bays, a plurality of vehicles, and a plurality of vehicle storage areas, in accordance with example embodiments herein.

FIG. 1 is a perspective view, as seen from above, of a loading dock 100 including a loading facility 101, a plurality of docking bays 102d-110d, a plurality of vehicles 106v and 110v, and a plurality of vehicle storage areas 102s, 106s, and 110s, in accjordance with example embodiments herein. In some embodiments, loading dock 100 may, for example, be associated with a retail store, a wholesale store, or other such commercial building. In other embodiments, loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example, FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, or, in some embodiments lower (such as with a drop-frame trainer, with respect to the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

Each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage area 102s interfaces with the opening of docking bay 102d such that the interior of vehicle storage area 102s may be viewed or accessed from docking bay 102d. Similarly, vehicle storage area 110s is also depicted as a trailer that is docked with docking bay 110d, where the opening of vehicle storage area 110s interfaces with the opening of docking bay 110d such that the interior of vehicle storage area 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or otherwise dimensions. For example, in one embodiment, the vehicle storage area 102s may be associated with a 63 foot long trailer, vehicle storage area may be associated with a 53 foot long trailer, and vehicle storage area 110s may be associated with a 73 foot long trailer. In addition, the vehicle storage areas 102s, 106s, and 110s may be of different types, including, for example, a straight-rail trailer or a drop-frame trailer. Other variations of vehicle storage area dimensions, sizes, and/or lengths are contemplated herein. As described herein, vehicle storage areas (e.g., 102, 106s, and/or 110s) may be associated with vehicles 106v and 110v, which may be delivery trucks or other similar vehicles.

Figure 2A:
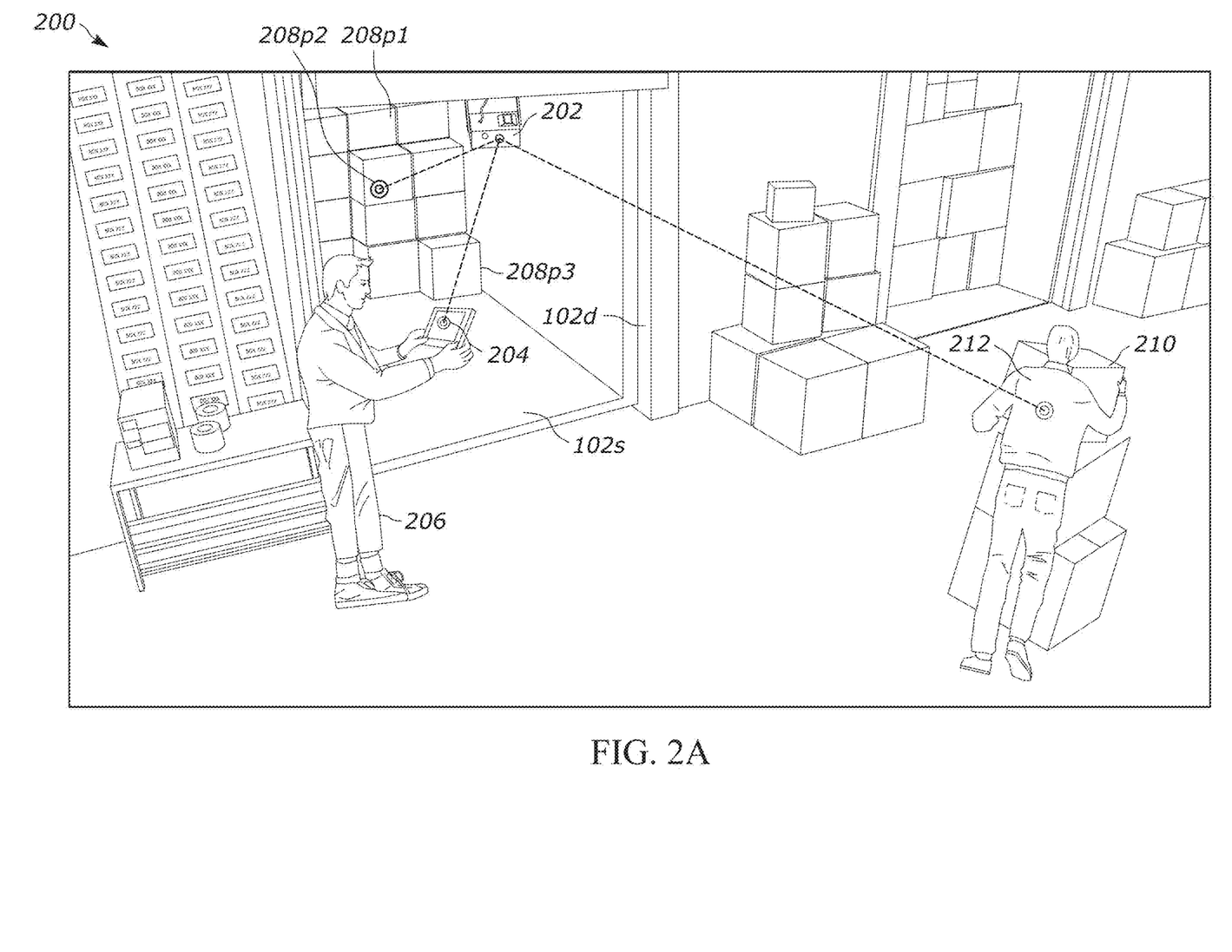
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG. 2A is an interior view of the docking bay 102d of FIG. 1. As depicted in FIG. 2A, vehicle storage area 102s is docked with docking bay 102d exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data/datasets) and a photo-realistic camera (e.g., 2D image data/datasets). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102s to capture 3D and/or 2D image data of the interior of vehicle storage area 102s. For example, as shown in FIG. 2A, TMU 202 may be oriented such that the 3D and 2D cameras of TMU 202 look down the length of the vehicle storage area 102s so that TMU 202 may scan or sense the walls, floor, ceiling, packages (e.g., 208p1-208p3 or 210), or other objects or surfaces with vehicle storage area 102s to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that TMU 202 may capture 3D and/or 2D image data/datasets of a variety of storage areas, such that additional storage areas (e.g., warehouses, etc.) in addition to the vehicle storage areas are contemplated herein.

In some embodiments, for example, the TMU 202 may process the 3D and 2D image data/datasets, as scanned or sensed from the 3D-depth camera and photo-realistic camera, for use by other devices (e.g., client device 204 or server 301, as further described herein). For example, the one or more processors and/or one or more memories of the TMU 202 may process the image data/datasets scanned or sensed from vehicle storage area 102s. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data/dataset and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210). In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data/datasets and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or servers may generate post-scanning data, which may include metadata, simplified data, normalized data, result data, status data, or alert data as determined from the original scanned or sensed image data provided by the TMU 202. As described herein, the server or other centralized processing unit and/or storage may store such data, and may also send the image data and/or post-scanning data to a dashboard app, or other app, implemented on a client device, such as the dashboard app implemented on client device 204 of FIG. 2A.

Figure 2B:
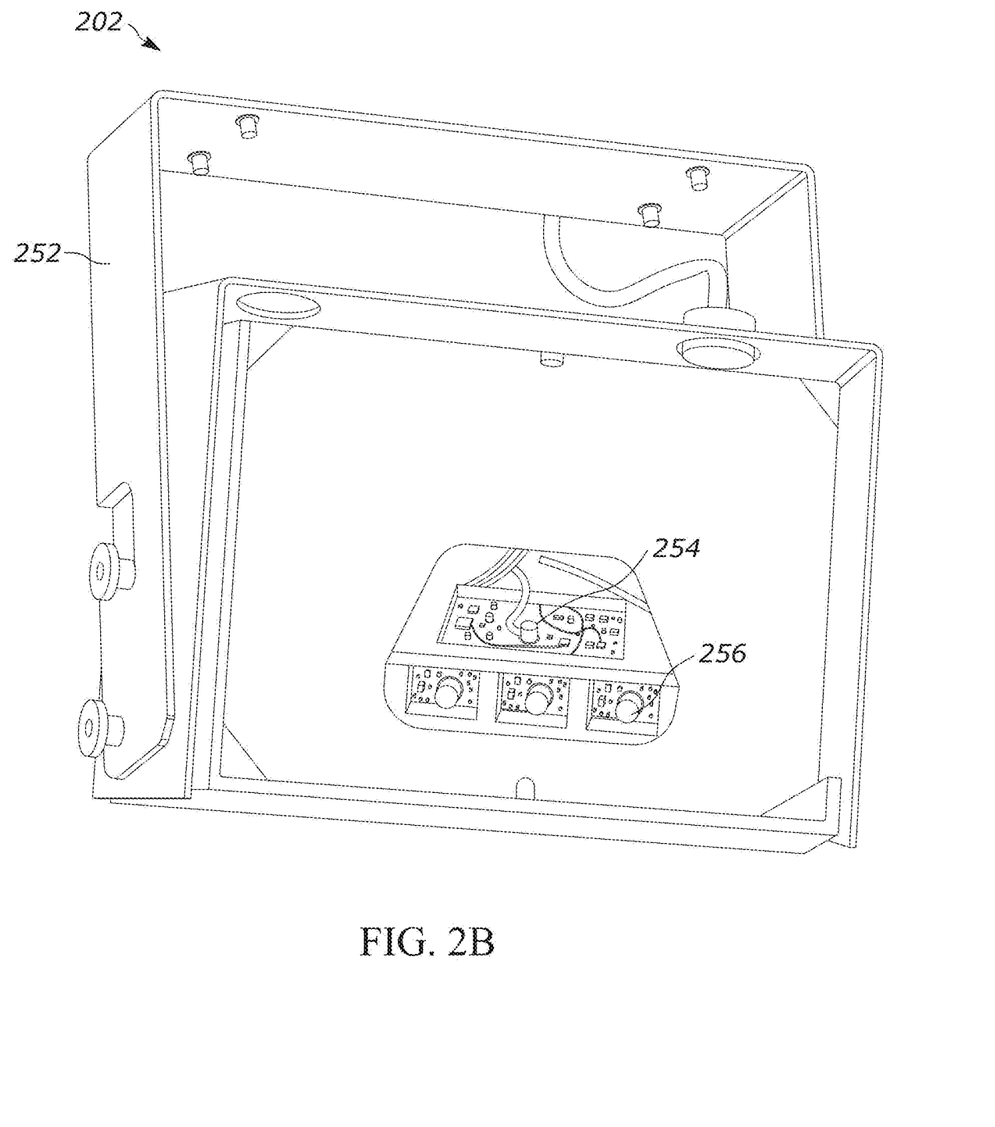
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data/datasets and/or post-scanning data. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

TMU 202 may include a 3D-depth camera 254 for capturing, sensing, or scanning 3D image data/datasets. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102s) or objects within the vehicle storage area, such as boxes or packages (e.g., packages 208p1-208p3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102s. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102s and any objects or surfaces therein.

The TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
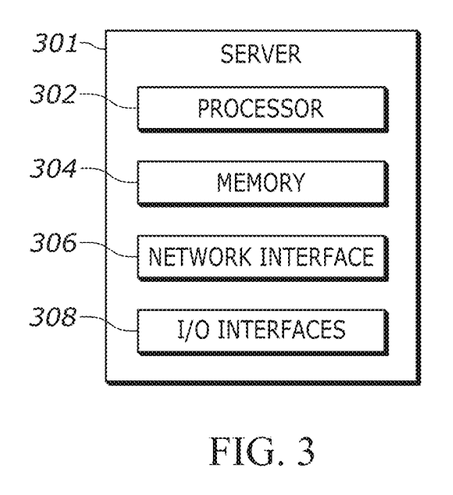
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In either embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4A:
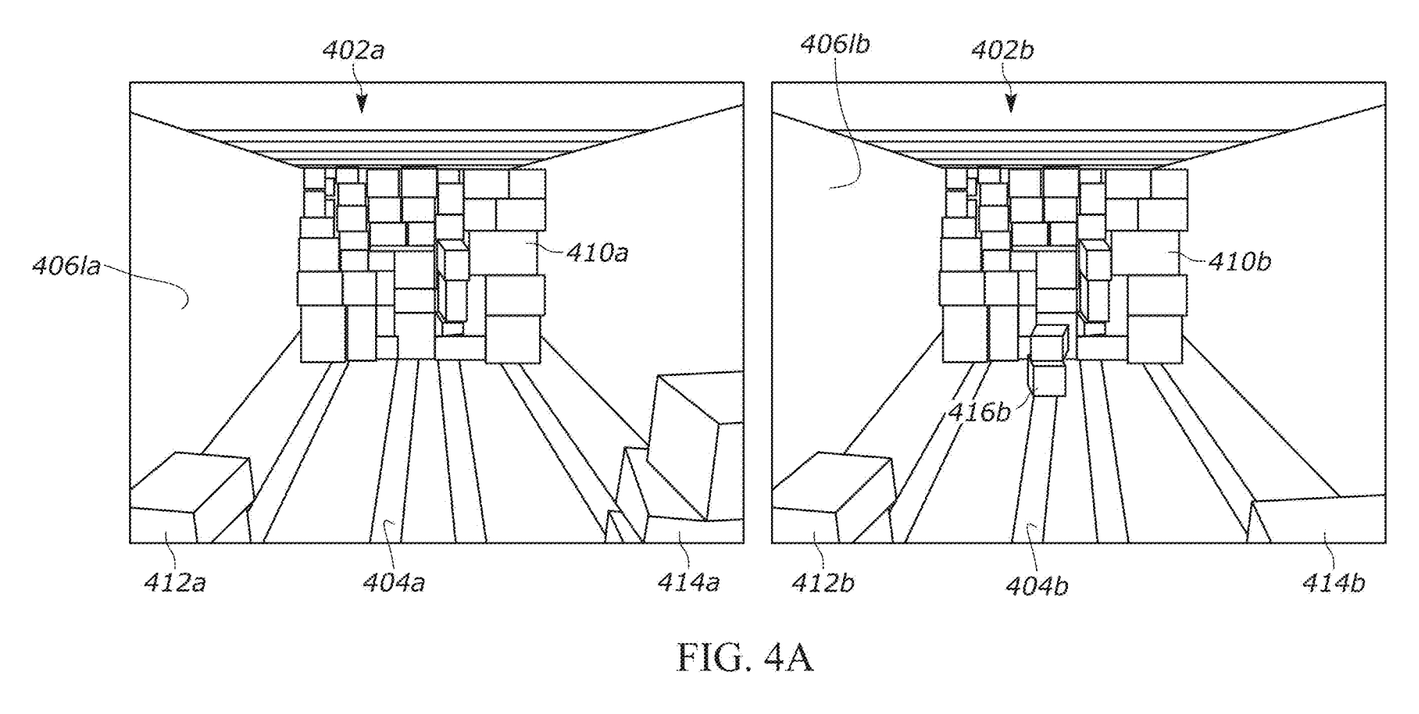
FIG. 4A illustrates a first set of photo-realistic images depicting a first embodiment of the vehicle storage area docked at the docking bay of FIG. 2A.

FIG. 4A illustrates a first set of photo-realistic images 402a and 402b depicting an embodiment of the vehicle storage area docked at the docking bay of FIG. 2A. In particular, each of image 402a and image 402b represents respective 2D (RGB) images of the vehicle storage area docked at the docking bay of FIG. 2A. The vehicle storage area of FIG. 4A illustrates an example of a 2D image of a straight-rail trailer type. In various embodiments, frames 402a and 402b may have been captured by TMU 202, e.g., by the photo-realistic camera 256 of TMU 202 as described herein. In addition, frames 402a and 402b may each include 2D image data, such as pixel data or RGB data as described herein.

Image 402a depicts certain surface areas of the vehicle storage area that define the vehicle storage area, including left wall 406l​a and floor 404a of the vehicle storage area. Image 402a also depicts various items, including packages, loaded into the vehicle storage area. These include package wall 410a, packages 412a and packages 414a. As used herein, a package wall may be a stack of packages, boxes, or other transportable objects or goods typically involved in distribution and logistics. A package wall may also be a single package that forms the foundation of a new package wall. Each of the packages, boxes, or other transportable objects or goods that make up a particular package wall may share a common depth, dimension, or length such that the particular package wall, as a whole, contains at least one uniform or approximately uniform depth, dimension, or length.

Image 402b represents the same vehicle storage area as depicted in image 402a, but at a different time. For example, image 402b may represent the 2D (RGB) image of the vehicle storage area of image 402a, but at a future time where packages 414a have been moved, as shown via packages 414b and packages 416b. For example, packages 416b may represent a portion of packages 414a that have been moved to form a new or additional package wall. All other items, in the example of FIG. 4A, may have remained the same between frames 402a and 402b, where wall 406lb, floor 404b, package wall 410b, packages 412b of image 402b correspond to wall 406l​a, floor 404a, package wall 410a, packages 412a of image 402a, respectively.

Figure 4B:
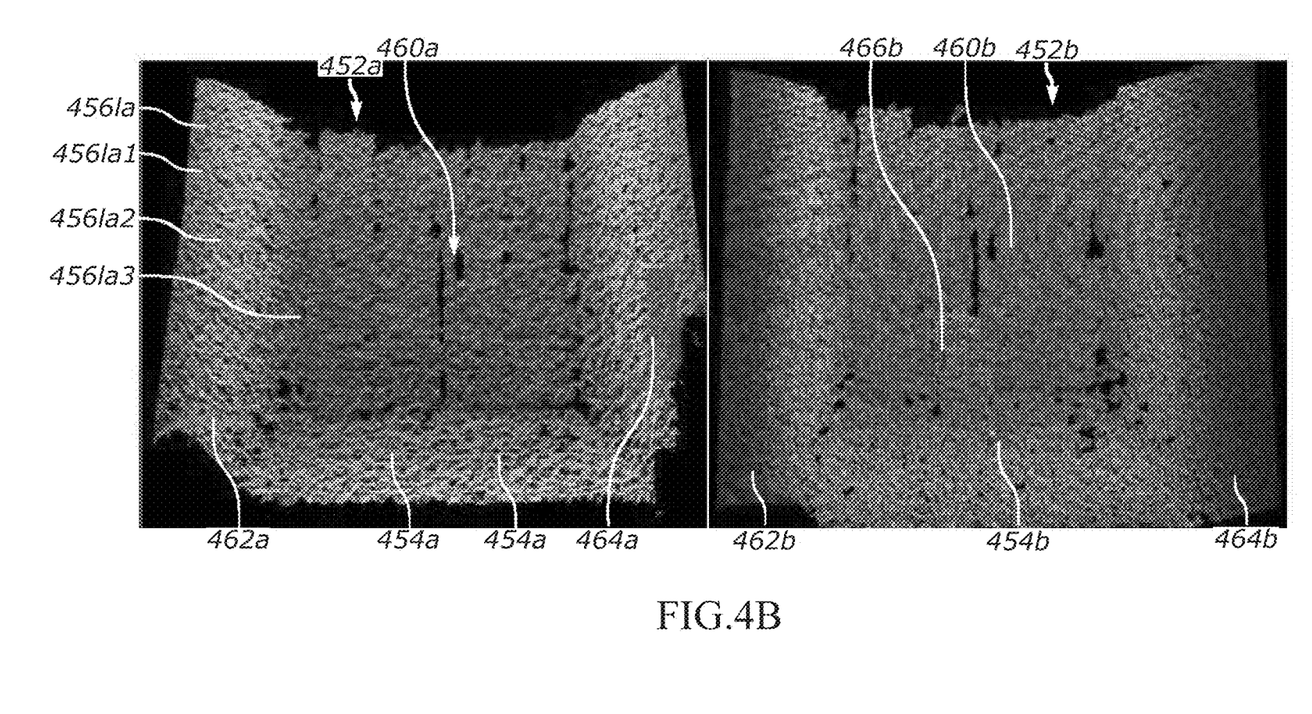
FIG. 4B illustrates depth-map renderings corresponding to the first set of photo-realistic images of FIG. 4A.

FIG. 4B illustrates depth-map renderings corresponding to the first set of photo-realistic images of FIG. 4A. Images 452a and 452b of FIG. 4B represent 3D image data/datasets that correspond to 2D images 402a and 402b, respectively. Depth-map renderings illustrated by images 452a and 452b depict 3D images having 3D image data/datasets, of the vehicle storage area 102s docked at the docking bay 102d of FIG. 2A where the storage area includes a detected package wall (e.g., package wall 410a or 410b). Images 452a and 452b include depth-map renderings rendered as 3D images as captured, for example, by 3D-depth camera 254 of TMU 202. Depth-map renderings of images 452a and 452b may include 3D image data/datasets, such as depth values determined from a depth-map as described herein. The 3D image data may be point cloud data, where the point cloud data is associated with various color pixel values based on depths of the data points within depth-map renderings of images 452a and 452b as described herein. For example, point cloud data may include a set of data points that can represent depth, distances, and the 3D shape of surfaces or objects scanned by a 3D-depth camera.

Depth-map renderings of images 452a and 452b include the same or similar surfaces and objects as photo-realistic views of images 402a and 402b, except the depth-map rendering of images 452a and 452b represent such surfaces and objects via 3D imagery and/or data. For example, depth-map rendering of images 452a and 452b includes package walls 460a and 460b that correspond to package walls 410a and 410b (but are represented in via 3D imagery and/or data). For example, as for package walls 410a and 410b of photo-realistic views of images 402a and 402b, package walls 460a and 460b of depth-map renderings of images 452a and 452b are also located at the rear section of the vehicle storage area 102s. Similarly, vehicle storage area 102s is defined by surface areas including left wall 406l​a/ 406lb, and floor area 404a/404b of depth-map renderings of images 452a and 452b, which correspond to left wall 4561a, and floor area 454a/454b of photo-realistic views of images 402a and 402b.

Depth-map renderings of images 452a and 452b represent various depth values of the 3D image data via different color pixel values. For example, image 452a depicts an embodiment of a point cloud rendering of the vehicle storage area 102s, where the points of the point cloud are colored based on z-axis depth. Similarly, image 452b depicts an embodiment of a point cloud rendering of the vehicle storage area 102s, where the points of the point cloud are colored based on z-axis depth, but where boxes have been moved (as similarly described for corresponding RGB image 402b).

In the embodiment shown in FIG. 4B, an example color rendering scheme may represent depth values via different color pixels (e.g., different RGB pixel values) where the depth-map rendering of images 452a and 452b display nearer distances (e.g., smaller depth values) in warmer colors, but displays further distances (e.g., larger depth values) in cooler colors. For example, as shown in depth-map renderings of images 452a and 452b, the warm colors red, orange, and yellow may represent near depth values, but the cool colors green, cyan, and blue may represent far depth values. In some embodiments, each of the color values (e.g., each of several color pixels defined by RGB values) of depth-map renderings of images 452a and 452b may represent a unique depth value. For example, a pixel having a red-toned color (RGB values: 255, 0, 0) may represent a nearer distance (e.g., 5 feet from the 3D-depth camera), but a blue-toned color (RGB values: 0, 0, 255) may represent a further distance (e.g., 27 feet from the 3D-depth camera). Black or dark regions or areas represent regions that the 3D-depth camera did not read or sense. Such regions are referred to herein as void data regions.

As shown in the embodiment of FIG. 4B, left wall 4561a of depth-map rendering of image 452a is shown in a plurality of colors representing the various depths or distances of left wall 4561a from the 3D-depth camera (e.g., the 3D-depth camera 254) along the distance of the vehicle storage area 102s. As shown, the nearest portion 4561a1 of left wall 4561a is shown in red and/or orange pixels (e.g., red and/or orange pixels may represent distances of 1 to 10 feet), the second nearest portion 4561a2 is shown in yellow pixels (e.g., yellow pixels may represent distances of 10 to 15 feet), and the next nearest portion 4561a3 is shown green pixels (e.g., green pixels may represent distances of 15 to 20 feet). For example, as shown in depth-map rendering of image 452a, package wall 460a is depicted in green pixels because it was detected between 20-25 feet from the 3D-depth camera (e.g., the 3D-depth camera 254). As the left wall 4561a, the right wall of vehicle storage area 102s is rendered with the same or similar colors down the length of right wall. It is to be understood that image 452b is rendered with the same color/distance algorithm as described for image 452a.

In will be understood that although described in the various embodiments herein, 3D-depth camera (e.g., the 3D-depth camera 254) is cable of detecting more precise distances than 2.5 or 5 foot increments. For example, 3D-depth camera may detect distances or depths of objects or surfaces as spaced inches or fractions of inches from one another. In addition, as described above, each pixel may represent a unique distance via RGB values such that any permutation of the RGB value spectrum, which includes RGB values (R: 0 to 255, G: 0 to 255, B: 0 to 255), may represent a unique depth value in the depth-map renderings of images 452a and 452b, which, in the given embodiments of depth-map renderings of images 452a and 452b, can represent over 16 million unique depth values for unique distances or depths for objects or surfaces within vehicle storage area 102s.

As further shown in depth-map renderings of images 452a and 452b, each of floor area 454a/454b, and packages 462a/462b, 464a/464b, 466b are depicted with red, orange and/or yellow-based depth values (e.g., near distances) from the 3D-depth camera (e.g., 3D-depth camera 254). Floor areas 454a/454b of FIG. 4B correspond to floor areas 404a/404b of FIG. 4A, packages 462a/462b of FIG. 4B correspond to packages 412a/412b of FIG. 4A, and packages 464a/464b of FIG. 4B correspond to packages 414a/414b of FIG. 4A. Package 466b of FIG. 4B corresponds to package 416b FIG. 4A.

Figure 5A:
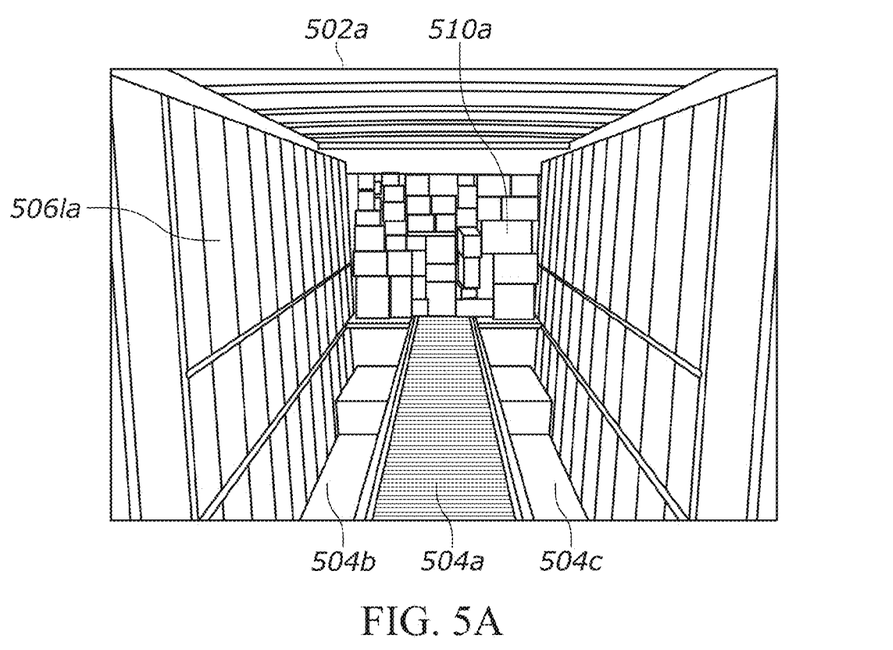
FIG. 5A is a second photo-realistic image depicting a second embodiment of a second vehicle storage area docked at the docking bay of FIG. 2A.

FIG. 5A is a second photo-realistic image 502a depicting a second embodiment of a second vehicle storage area docked at the docking bay of FIG. 2A. In particular, image 502a represents a respective 2D (RGB) image of the vehicle storage area docked at the docking bay of FIG. 2A. The vehicle storage area of FIG. 5A illustrates an example of a 2D image of a drop-frame trailer type.

Image 502a may have been captured by TMU 202, e.g., by the photo-realistic camera 256 of TMU 202 as described herein. Image 502a may include 2D image data, such as pixel data or RGB data as described herein. In the embodiment of FIG. 5A, image 502a represents a 2D image of an empty or near-empty vehicle storage area of a drop-frame trailer. For example, the vehicle storage area illustrated by FIG. 5A may represent a vehicle storage area that is outbound with a loading state of the vehicle storage area being empty.

Image 502a depicts certain surface areas of the vehicle storage area that define the vehicle storage area, including left wall 5061a, raised floor 504a, lower floor 504b, and lower floor 504c of the vehicle storage area. Each of left wall 5061a, raised floor 504a, lower floor 504b, and lower floor 504c comprises a plane or planar surface of, or that otherwise define, the vehicle storage area. Image 502a also depicts various items, including packages, loaded into the vehicle storage area. For example, this includes package wall 510a. It is to be understood that the disclosure with respect to the photo-realistic images, related frames, views, data/datasets, or otherwise as disclosed for FIG. 4A applies equally herein for the photo-realistic images, and related frames, views, data/datasets, or otherwise of FIG. 5A.

Figure 5B:
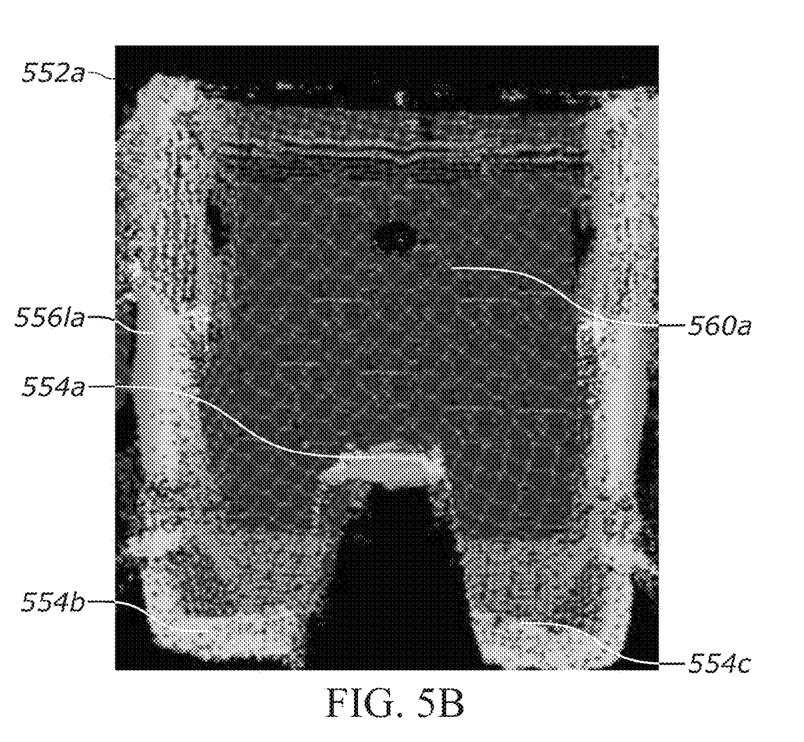
FIG. 5B illustrates depth-map rendering of the second set of photo-realistic image of FIG. 5A.

FIG. 5B illustrates a depth-map rendering of the second set of photo-realistic image of FIG. 5A. That is, FIG. 5B illustrates a depth-image of the drop frame trailer of FIG. 5A. Image 552a of FIG. 5B represents 3D image data/dataset(s) that corresponds to 2D image 502a of FIG. 5A. The depth-map rendering illustrated by image 552a depicts a 3D image having 3D image data/dataset(s), of the vehicle storage area 102s, for example, as docked at the docking bay 102d of FIG. 2A. Image 552a includes a depth-map rendering rendered as a 3D images as captured, for example, by 3D-depth camera 254 of TMU 202. The depth-map rendering of image 552a may include 3D image data/dataset(s), such as depth values determined from a depth-map as described herein. The 3D image data may be point cloud data, where the point cloud data is associated with various color pixel values based on depths of the data points within depth-map renderings of images 452a and 452b as described herein. For example, point cloud data may include a set of data points that can represent depth, distances, and the 3D shape of surfaces or objects scanned by a 3D-depth camera.

It is to be understood that the disclosure with respect to the depth-map renderings, related images, images, views, data/datasets, or otherwise as disclosed for FIG. 4B applies equally herein for the depth-map renderings and related images, images, views, data/datasets, or otherwise of FIG. 5B.

The depth-map rendering of images 552a include the same or similar planes/surfaces and objects as the photo-realistic view of images 502a, except the depth-map rendering of image 552a represents such planes/surfaces and objects via 3D imagery and/or data. For example, the depth-map rendering of image 552a includes package wall 560a that corresponds to package wall 510a (but is represented in via 3D imagery and/or data). For example, as for package wall 510a of the photo-realistic view of image 502a, package wall 510a of the depth-map rendering of image 552a is also located at the rear section of the vehicle storage area 102s. Similarly, vehicle storage area 102s, of the depth-map rendering of image 522a is defined by surface areas/planes including left wall 5561a, raised floor 554a, lower floor 554b, and lower floor 554c renderings of image 552a, which respectively correspond to left wall 5061a and raised floor 504a, lower floor 504b, and lower floor 504c of the photo-realistic view of image 502a of FIG. 5A The depth-map rendering of image 552a represents various depth values of the 3D image data via different color pixel values. For example, image 552a depicts an embodiment of a point cloud rendering of the vehicle storage area 102s, where the points of the point cloud are colored based on z-axis depth and define a 3D image of a drop-frame trailer type. FIG. 5B is rendered via the same rendering scheme (e.g., the distance of objects or surfaces are delimited via corresponding different colors) as described for 4B. It is to be understood that the coloring/distance scheme described for FIG. 4B applies equally for FIG. 5B, and for the depth-map rendering of image 552a, as described herein.

As further shown in the depth-map rendering of image 552a, package wall 560a is depicted with green depth values (e.g., far distances) from the 3D-depth camera (e.g., 3D-depth camera 254). Raised floor 554a, lower floor 554b, and lower floor 554c are depicted red, orange and/or yellow-based depth values (e.g., near distances) from the 3D-depth camera (e.g., 3D-depth camera 254).

Figure 6:
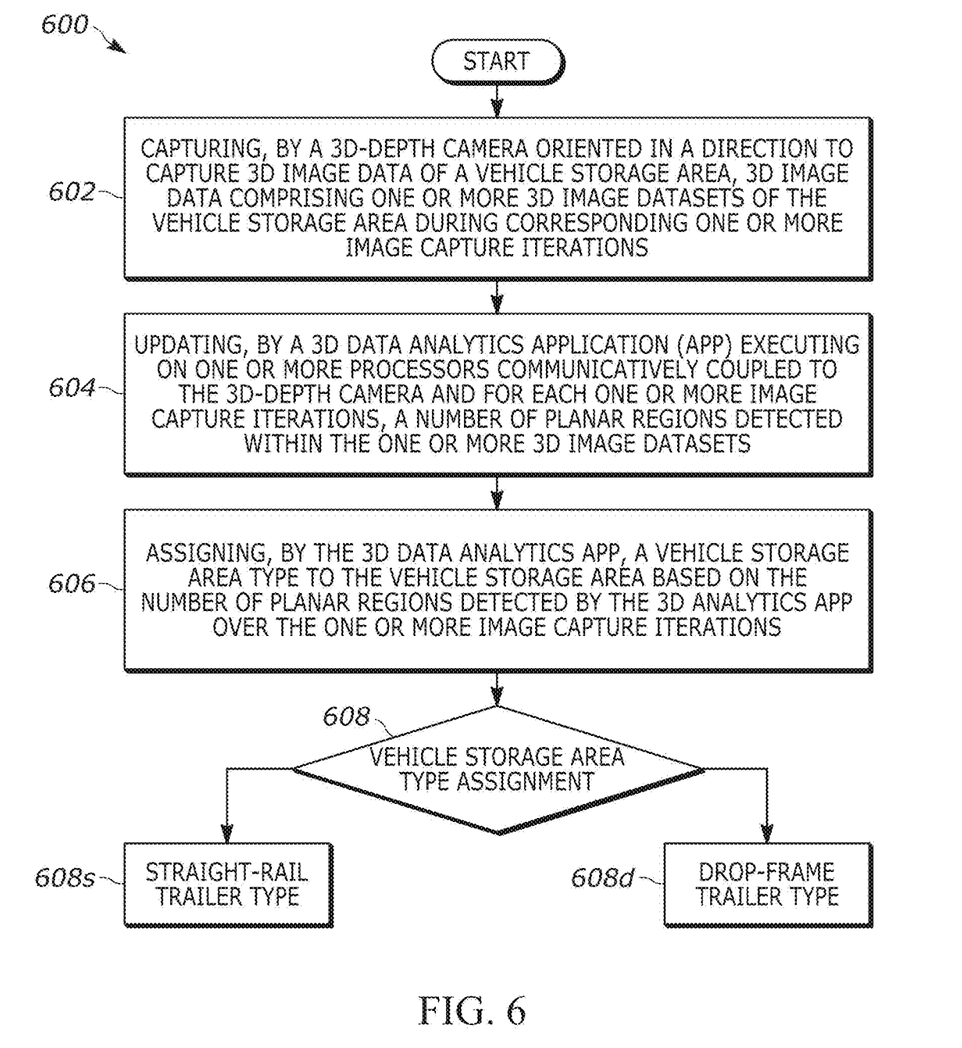
FIG. 6 is a flow chart of a 3D imaging method for detecting and dimensioning a vehicle storage area, in accordance with various embodiments herein.

FIG. 6 is a flow chart of a 3D imaging method 600 for detecting and dimensioning a vehicle storage area. The example flow chart of FIG. 6 represents an algorithm that may be implemented by one or more processor(s) (e.g., any of one or more processors of TMU 202, server 301, and/or of a client device) to detect and dimension a vehicle storage area as described herein. For example, in one embodiment, the 3D-depth camera (e.g., 3D-depth camera 254) and the one or more processors are housed in a mountable device (e.g., TMU 202). Additionally or alternatively, the one or more processors may be remote to the 3D-depth camera where the one or more processors are part of, or comprise, server 301 commutatively coupled to the 3D-depth camera (e.g., 3D-depth camera 254 of TMU 202) through a computer network. In addition, in some embodiments, method 600 may be implemented across numerous iterations.

At block 602, 3D imaging method 600 includes capturing, by a 3D-depth camera (e.g., a 3D-depth camera 254 of TMU 202) oriented in a direction to capture 3D image data of a vehicle storage area (e.g., vehicle storage area 102s), 3D image data comprising one or more 3D image datasets of the vehicle storage area during corresponding one or more image capture iterations. As described further herein, in some embodiments, the one or more image capture iterations may be limited to a predefined number of iterations. For example, in an embodiment, up to 5 iterations may be performed.

At block 604, 3D imaging method 600 further comprises updating, by a 3D data analytics application (app) executing on one or more processors communicatively coupled to the 3D-depth camera and for each one or more image capture iterations, a number of planar regions detected within the one or more 3D image datasets. For example, in some embodiments, on a given capture iteration, the 3D data analytics app may analyze the 3D image data to detect a planar region (e.g., any of raised floor 554a, lower floor 554b, and lower floor 554c of FIG. 5B) to update or otherwise determine or count the number of planar regions. In some embodiments, the number of planes may be updated or counted by 3D data analytics app regardless of the type of planar region, e.g., whether the planar region is a raised floor plane (e.g., raised floor 554a) or a lower floor plane (e.g., lower floor 554b and/or lower floor 554c).

The planar region may be detected by the 3D data analytics app using various data analytic techniques. For example, for a given capture iteration, 3D data analytics app may analyze a given set of captured 3D image data with planar Random Sample Consensus (RANSAC) segmentation in order to detect 3D data point inliers of a 2D plane/planar surface within the set of 3D image data. For example, a detected 2D plane/planar surface could include any one or more of raised floor 554a, lower floor 554b, and/or lower floor 554c of FIG. 5B. A 2D plane/planar surface (e.g., such as any of raised floor 554a, lower floor 554b, and/or lower floor 554c) may have 3D points within the 2D plane region defining a surface in a 3D space. For example, the number of points for a given plane may vary, and may include, e.g., 10,000 3D points to 3D 17,000 points, each of which may define the region of the planar surface within 3D space.

In some embodiments, each capture iteration may involve "loosening," relaxing, or otherwise changing threshold values or parameters relating to the 3D data points, and their associations with the planar surfaces detected in 3D image data, as analyzed by the 3D data analytics app. For example, threshold values or parameters to loosen include, e.g., the maximum "thickness" of the plane (which may correspond to standard deviation of the points for a given plane), the angle of the plane, and/or the minimum number of points required to compose the plane. Generally, loosening the threshold values or parameters changes the sensitivity of the 3D data analytics app to detect (or not detect) (e.g., using RANSAC segmentation as described herein) a plane/planar surface within a set of 3D image data. For example, threshold values or parameters may be "loosened" in order to sweep in outliers (e.g., 3D data analytics app detects outliers) that allows the 3D data analytics app detect planes in the 3D image data that are thicker than compared to a previous capture iteration were the threshold values or parameters were more stringent. For example, loosening a threshold value or parameter may allow for the 3D data analytics app to detect planar surfaces having approximately 15,000 points where, in a previous capture iteration, the threshold value or parameter required approximately 20,000 3D points to define a region of a planar surface within 3D space.

In various embodiments, each planar region detected by the data analytics app is comprised of a dataset of 3D data points defining a planar surface (e.g., such as any of raised floor 554a, lower floor 554b, and/or lower floor 554c). In such embodiments, each planar surface may have a planar thickness value or parameter (e.g., a 2.5 standard deviation value for 3D points defining a plane). The 3D data analytics app, upon each iteration of the one or more image capture iterations, is configured to increase a planar thickness threshold (e.g., increased to 3.0 standard deviation value). During a particular iteration (e.g., the $3^{rd}$ iteration), the 3D analytics app, for that particular iteration and planar thickness threshold, may detect a floor plane (e.g., raised floor 554a) of the vehicle storage area when the planar thickness value is within the planar thickness threshold.

Additionally, or alternatively, each planar surface (e.g., such as any of raised floor 554a, lower floor 554b, and/or lower floor 554c) may further be associated with a planar error angle value or parameter. In such embodiments, the 3D data analytics app, upon each iteration of the one or more image capture iterations, may increase a planar error angle threshold (e.g., 0 degrees to 5 degrees perpendicular to gravity) causing the 3D analytics app to detect the floor plane, during the particular iteration, when the planar error angle value is within the planar thickness threshold.

Accordingly, as described for the above embodiments, upon each capture iteration where the data analytics app detects no floor planes within the 3D data, the threshold values or parameters may be loosened allowing and, possibly causing, the data analytics app to detect floor planes (e.g., such as any of raised floor 554a, lower floor 554b, and/or lower floor 554c) on future iterations. This is especially important for drop-frame trailers because each of the typical three floors of a drop-frame trailer are generally small, not very flat, and may not be detected at first (e.g., upon a first capture iteration) with strict parameters.

At block 606, 3D imaging method 606 further comprises assigning, by the 3D data analytics app, a vehicle storage area type to the vehicle storage area (e.g., vehicle storage area 102s) based on the number of planar regions detected by the 3D analytics app over the one or more image capture iterations.

At block 608, the vehicle storage area type assigned may be one of (1) a straight-rail trailer type 608s when the number of planar regions detected equals one planar region, or (2) a drop-frame trailer type 608d when the number of planar regions detected exceeds one planar region.

For example, in embodiments where a predefined number of 3D image capture iterations are performed, at the end of the predefined number of iterations (e.g., 5 iterations), method 600 will determine, by 3D data analytics app, a number of planar regions detected in the 3D image data. If only a single plane is detected upon completion of the predefined number of iterations, then then the vehicle storage area is determined to be a straight-rail trailer and a straight-rail trailer type is assigned. However, if two or more planes are detected upon completion of the predefined number of iterations, then then the vehicle storage area is determined to be a drop frame trailer and a drop-frame trailer type is assigned.

In some embodiments, where the vehicle storage area type assigned is the drop-frame trailer type, 3D imaging method 600 may further include detecting, by the 3D data analytics app based on the one or more 3D image data/datasets (e.g., via RANSAC segmentation), at least two planar regions comprising a first planar region corresponding to a raised floor plane (e.g., raised floor 554a) of the vehicle storage area and a second planar region corresponding to at least one lower floor plane (e.g., lower floor 554b and/or lower floor 554c) of vehicle storage area. In such embodiments, 3D imaging method 600 may further include dimensioning, by the 3D data analytics app based on the raised floor plane and the at least one lower floor plane, a cropped 3D storage area of the vehicle storage area. Cropping may include, for example, deleting, removing, shifting, or otherwise altering the 3D image data/datasets. In particular, the cropped 3D storage area may be dimensioned by the 3D data analytics app by cropping (e.g., removing, deleting, shifting, or alerting) a lower 3D portion of the vehicle storage area located, within the 3D image data, between the at least one lower floor plane and the raised floor plane. For example, the 3D data analytics app may crop, by removing, deleting, shifting, or alerting, 3D data points within the 3D image data/dataset(s). In such embodiments, the 3D image data/datasets, as analyzed by 3D data analytics app, is cropped to exclude all floor planes below the upper-most one. In such embodiments, all subsequent metric algorithms (e.g., to determine fullness of a vehicle storage area) are applied to this cropped image. That is, such cropping allows for the 3D data analytics app to determine the fullness (e.g., package fullness) of a drop-framed type vehicle storage area based on a more simple rectangular dimensioned trailer, as would be performed, e.g., for a straight-rail trailer.

In various embodiments, the cropped 3D storage area may be further analyzed or dimensioned by the 3D data analytics app by determining an estimated fullness value of the vehicle storage area based on the cropped 3D storage area. For example, in at least some embodiments, to generate accurate metrics, the upper-most detected plane (e.g., raised floor 554a) is set as the floor of the trailer for purposes of dimensioning and providing the fullness value. In such embodiments, this causes the dimensions to include only the rectangular portion of the trailer, and allows the load monitoring unit to exclude (i.e., crop) measuring the bottom compartments. In such embodiments, the 3D data analytics app modifies the fullness values or percentages to account for an estimated fullness of the bottom compartments.

For example, in an embodiment where the 3D data analytics app reports 80% fullness of a drop-frame vehicle storage area (based on raw 3D data image analysis of a drop-frame vehicle storage area), the 3D data analytics app may crop or ignore the lower compartments, as described herein, such that the fullness value estimate is modified accordingly (e.g., the lower compartment is typically 90% full when the upper compartment is 80% full observed typical values). In addition, typical values of storage area sizes/percentage may be based on known, different drop-frame trailer types where the lower component percentages may be taken into account based on trailer type (e.g., 25% total storage area of a 28-foot drop trailer type, 28% storage area of a 33-foot drop trailer types, etc.). Such typically values may be automatically loaded or manually entered, e.g., in a memory of TMU 202/memory 304, for retrieval and execution by 3D data analytics app. For example, for a 28-foot drop trailer type, the 3D data analytics app may be configured to account for the lower compartments occupying 25% of the trailer space. In such an embodiment, when the 3D data analytics app reports 80% fullness of a drop-frame vehicle storage area, the 3D data analytics app modifies the overall fullness value or percentage to be 82.5% based on 80% (fullness)*75% (upper compartment area; not cropped)+90% (estimated fullness)*25% (lower compartment area; cropped)).

The fullness values is generally determined based on the number of packages or package walls (e.g., package wall 510a) within the cropped 3D storage area. Thus, as the package walls/packages within the cropped 3D storage area are detected closer to the 3D-depth camera 254 of TMU 202, the fullness value will be updated, e.g., by the one or more processors of TMU 202, with an increased fullness value (e.g., increased percentage fullness of the 3D storage area). Such fullness values is therefore representative of the fullness of the vehicle storage area as a whole.

In addition, in further embodiments, a memory (e.g., a memory of TMU 202/memory 304), may store a trailer status parameter (e.g., an extensible markup language (XML) parameter) defining a loading state of the vehicle storage area. The trailer status parameter may define whether a vehicle storage area (e.g., vehicle storage area 102s, 106s, and/or 110s) associated with a vehicle (e.g., 106v and/or 110v) is inbound (e.g., vehicle storage area arrives full to be unloaded), or outbound (vehicle storage area arrives empty to be filled).

Accordingly, in some embodiments, the trailer status parameter indicates that a vehicle (e.g., 106v and/or 110v) corresponding to a vehicle storage area (e.g., vehicle storage area 102s, 106s, and/or 110s) is inbound and the loading state of the vehicle storage area is full. If the vehicle storage area is inbound, method 600 for detecting and dimensioning a vehicle storage area, as described herein, may be performed at the end of the load (once the vehicle storage area is empty).

In other embodiments, the trailer status parameter indicates that a (e.g., 106v and/or 110v) corresponding to the vehicle storage area (e.g., vehicle storage area 102s, 106s, and/or 110s) is outbound and the loading state of the vehicle storage area is empty. If the trailer is outbound, method 600 for detecting and dimensioning a vehicle storage area, as described herein, may be performed at the beginning of the load (while the vehicle storage area is still empty).

In some embodiments, an XML parameter, as the trailer status parameter, is stored on TMU 202. Such value may be stored when the TMU is installed for a particular door of a particular docking bay (e.g., docking bay 104d). In such embodiments the docking bay is designated as an inbound or outbound and the trailer status parameter is set for the TMU unit at that time. Additionally, or alternatively, the trailer status parameter may be set remotely via network server (e.g., server 301).

In some embodiments, the three-dimensional (3D) imaging systems and methods, as described herein, may further comprise a dashboard app. In such embodiments, the dashboard app executing on a client device, e.g., such as client device 204, indicates, on a display of the client device, the vehicle storage area type corresponding to the vehicle storage area. For example, the type of trailer (e.g., straight-rail or drop frame) may be transmitted from TMU 202 to the dashboard app. In addition, a door-status/loading state message(s) may also be sent to the dashboard app regarding the loading state of the vehicle storage area. Additionally, or alternatively, the dashboard app may be configured to display a graphical representation of the vehicle storage area (e.g., vehicle storage area 102s, 106s, and/or 110s) including, for example, an estimated fullness value of the vehicle storage area, in accordance with the disclosure herein, on the display of the client device.

Components represented by the flowchart of FIG. 6 are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A three-dimensional (3D) imaging system configured to detect and dimension a vehicle storage area, the 3D imaging system comprising:
   a 3D-depth camera configured to capture 3D image data, the 3D-depth camera oriented in a direction to capture 3D image data of a vehicle storage area; and
   a 3D data analytics application (app) executing on one or more processors communicatively coupled to the 3D-depth camera, the 3D data analytics app configured to:
   capture one or more 3D image datasets of the vehicle storage area during corresponding one or more image capture iterations,
   update, for each one or more image capture iterations, a number of planar regions detected within the one or more 3D image datasets,
   assign a vehicle storage area type to the vehicle storage area based on the number of planar regions detected by the 3D analytics app over the one or more image capture iterations,
   wherein the vehicle storage area type assigned is one of (1) a straight-rail trailer type when the number of planar regions detected equals one planar region, or (2) a drop-frame trailer type when the number of planar regions detected exceeds one planar region,
   wherein:
      each planar region is comprised of a dataset of 3D data points defining a planar surface, each planar surface having a planar thickness value;
      the 3D data analytics app, upon each iteration of the one or more image capture iterations, increases a planar thickness threshold;
      the 3D analytics app detects, during a particular iteration, a floor plane of the vehicle storage area when the planar thickness value is within the planar thickness threshold;
      each planar surface is associated with a planar error angle value;
      3D data analytics app, upon each iteration of the one or more image capture iterations, increases a planar error angle threshold; and
      the 3D analytics app detects the floor plane, during the particular iteration, when the planar error angle value is within the planar thickness threshold.

2. The 3D imaging system of claim 1, wherein the vehicle storage area type assigned is the drop-frame trailer type, and wherein the 3D data analytics app is further configured to:
   detect, based on the one or more 3D image datasets, at least two planar regions comprising a first planar region corresponding to a raised floor plane of the vehicle storage area and a second planar region corresponding to at least one lower floor plane of vehicle storage area,
   dimension, based on the raised floor plane and the at least one lower floor plane, a cropped 3D storage area of the vehicle storage area, wherein the cropped 3D storage area is dimensioned by the 3D data analytics app cropping a lower 3D portion of the vehicle storage area located, within the 3D image data, between the at least one lower floor plane and the raised floor plane, and
   determine an estimated fullness value of the vehicle storage area based on the cropped 3D storage area.

3. The 3D imaging system of claim 1, wherein the one or more image capture iterations are limited to a predefined number of iterations.

4. The 3D imaging system of claim 1 further comprising a memory configured to store a trailer status parameter defining a loading state of the vehicle storage area.

5. The 3D imaging system of claim 4, wherein the trailer status parameter indicates that a vehicle corresponding to the vehicle storage area is inbound and the loading state of the vehicle storage area is full.

6. The 3D imaging system of claim 4, wherein the trailer status parameter indicates that a vehicle corresponding to the vehicle storage area is outbound and the loading state of the vehicle storage area is empty.

7. The 3D imaging system of claim 1, further comprising a dashboard app, the dashboard app executing on a client device, and wherein the dashboard app indicates, on a display of the client device, the vehicle storage area type corresponding to the vehicle storage area.

8. The 3D imaging system of claim 7, wherein the dashboard app is configured to display a graphical representation of the vehicle storage area, the graphical representation rendering an estimated fullness value on the display of the client device.

9. The 3D imaging system of claim 1, wherein the 3D-depth camera and the one or more processors are housed in a mountable device.

10. The 3D imaging system of claim 1, wherein the one or more processors are remote to the 3D-depth camera, the one or more processors comprising a server commutatively coupled to the 3D-depth camera through a computer network.

11. A three-dimensional (3D) imaging method for detecting and dimensioning a vehicle storage area, the 3D imaging method comprising:
   capturing, by a 3D-depth camera oriented in a direction to capture 3D image data of a vehicle storage area, 3D image data comprising one or more 3D image datasets of the vehicle storage area during corresponding one or more image capture iterations;
   updating, by a 3D data analytics application (app) executing on one or more processors communicatively coupled to the 3D-depth camera and for each one or more image capture iterations, a number of planar regions detected within the one or more 3D image datasets; and
   assigning, by the 3D data analytics app, a vehicle storage area type to the vehicle storage area based on the number of planar regions detected by the 3D analytics app over the one or more image capture iterations,
   wherein the vehicle storage area type assigned is one of (1) a straight-rail trailer type when the number of planar regions detected equals one planar region, or (2) a drop-frame trailer type when the number of planar regions detected exceeds one planar region,
   wherein:
      each planar region is comprised of a dataset of 3D data points defining a planar surface, each planar surface having a planar thickness value;
      the 3D data analytics app, upon each iteration of the one or more image capture iterations, increases a planar thickness threshold;
      the 3D analytics app detects, during a particular iteration, a floor plane of the vehicle storage area when the planar thickness value is within the planar thickness threshold;
      each planar surface is associated with a planar error angle value;

3D data analytics app, upon each iteration of the one or more image capture iterations, increases a planar error angle threshold; and the 3D analytics app detects the floor plane, during the particular iteration, when the planar error angle value is within the planar thickness threshold.

12. The 3D imaging method of claim 11, wherein the vehicle storage area type assigned is the drop-frame trailer type, and wherein the 3D imaging method further comprises:

detecting, by the 3D data analytics app based on the one or more 3D image datasets, at least two planar regions comprising a first planar region corresponding to a raised floor plane of the vehicle storage area and a second planar region corresponding to at least one lower floor plane of vehicle storage area, dimensioning, by the 3D data analytics app based on the raised floor plane and the at least one lower floor plane, a cropped 3D storage area of the vehicle storage area, wherein the cropped 3D storage area is dimensioned by the 3D data analytics app cropping a lower 3D portion of the vehicle storage area located, within the 3D image data, between the at least one lower floor plane and the raised floor plane, and determining, by the 3D data analytics app, an estimated fullness value of the vehicle storage area based on the cropped 3D storage area.

13. A tangible, non-transitory computer-readable medium storing instructions for detecting and dimensioning a vehicle storage area, that when executed by one or more processors cause the one or more processors to:

capture, by a 3D-depth camera oriented in a direction to capture 3D image data of a vehicle storage area, 3D image data comprising one or more 3D image datasets of the vehicle storage area during corresponding one or more image capture iterations;

update, by a 3D data analytics application (app) for each one or more image capture iterations, a number of planar regions detected within the one or more 3D image datasets; and assign, by the 3D data analytics app, a vehicle storage area type to the vehicle storage area based on the number of planar regions detected by the 3D analytics app over the one or more image capture iterations, wherein the vehicle storage area type assigned is one of (1) a straight-rail trailer type when the number of planar regions detected equals one planar region, or (2) a drop-frame trailer type when the number of planar regions detected exceeds one planar region wherein:

the vehicle storage area type assigned is the drop-frame trailer type;

the instructions are further configured, when executed by the one or more processors, to:

detect, based on the one or more 3D image datasets, at least two planar regions comprising a first planar region corresponding to a raised floor plane of the vehicle storage area and a second planar region corresponding to at least one lower floor plane of vehicle storage area, dimension, based on the raised floor plane and the at least one lower floor plane, a cropped 3D storage area of the vehicle storage area, wherein the cropped 3D storage area is dimensioned by the 3D data analytics app cropping a lower 3D portion of the vehicle storage area located, within the 3D image data, between the at least one lower floor plane and the raised floor plane, and determine an estimated fullness value of the vehicle storage area based on the cropped 3D storage area;

each planar region is comprised of a dataset of 3D data points defining a planar surface, each planar surface having a planar thickness value;

the 3D data analytics app, upon each iteration of the one or more image capture iterations, increases a planar thickness threshold;

the 3D analytics app detects, during a particular iteration, a floor plane of the vehicle storage area when the planar thickness value is within the planar thickness threshold;

each planar surface is associated with a planar error angle value;

3D data analytics app, upon each iteration of the one or more image capture iterations, increases a planar error angle threshold; and the 3D analytics app detects the floor plane, during the particular iteration, when the planar error angle value is within the planar thickness threshold.

* * * * *